United States Patent [19]

Rader et al.

[11] Patent Number: 4,871,089

[45] Date of Patent: Oct. 3, 1989

[54] HOT WATER DISPENSER

[76] Inventors: Edward F. Rader; Eileen Rader, both of 1019 S. Blanchard, Wheaton, Ill. 60187

[21] Appl. No.: 126,004

[22] Filed: Nov. 27, 1987

Related U.S. Application Data

[63] Continuation-in-part of Ser. No. 912,251, Sep. 29, 1986, abandoned.

[51] Int. Cl.$^4$ ............................................. A47J 31/057
[52] U.S. Cl. ........................................ 222/54; 99/280;
99/301; 99/304; 99/305; 219/296; 219/302;
219/306; 219/308; 222/146.5; 222/638;
236/101 R; 236/DIG. 5
[58] Field of Search .......................... 222/54, 638–641,
222/146.5, 146.1; 99/279–318; 219/296–299,
301–309; 236/DIG. 5, 68 R, 101 R, 101 A;
137/74, 75; 251/11

[56] References Cited

U.S. PATENT DOCUMENTS

| | | | |
|---|---|---|---|
| 2,511,635 | 6/1950 | Holmes | 219/296 X |
| 2,993,624 | 7/1961 | Crist et al. | 222/54 |
| 3,183,720 | 5/1965 | Baker | 236/DIG. 5 X |
| 3,194,009 | 7/1965 | Baker | 236/DIG. 5 X |
| 3,266,670 | 8/1966 | Brooks et al. | 222/54 |
| 3,333,527 | 8/1967 | Bender | 99/283 |
| 3,351,239 | 11/1967 | Flock | 222/54 |
| 3,413,909 | 12/1968 | Heier | 219/302 |
| 3,589,559 | 6/1971 | Colton et al. | 222/54 X |
| 3,948,156 | 4/1976 | Smith | 99/280 |
| 4,000,396 | 12/1976 | Abel, Jr. | 219/306 X |
| 4,121,508 | 10/1978 | Hartkorn | 219/281 X |
| 4,613,845 | 9/1986 | Marotta et al. | 222/146.5 X |
| 4,614,859 | 9/1986 | Beckering et al. | 222/146.5 X |
| 4,634,838 | 1/1987 | Berz | 222/146.5 X |

Primary Examiner—Kevin P. Shaver
Attorney, Agent, or Firm—Douglas B. White

[57] ABSTRACT

A hot water dispenser is provided for dispensing a selected volume of water at a predetermined water temperature. The dispenser has a body defining a predetermined sized cavity having an inlet for receiving cold water and an outlet for dispensing hot water. A heating mechanism is disposed within the body for heating the water contained within the cavity. A manually operable timer switch is operated to energize the heating mechanism and to select a time period for maintaining the heating mechanism energized. This selected time period determines the selected volume of heated water dispensed. A thermally responsive mechanism enables dispensing water from the outlet responsive to the predetermined water temperature of the heated water.

13 Claims, 3 Drawing Sheets

U.S. Patent  Oct. 3, 1989  Sheet 1 of 3  4,871,089
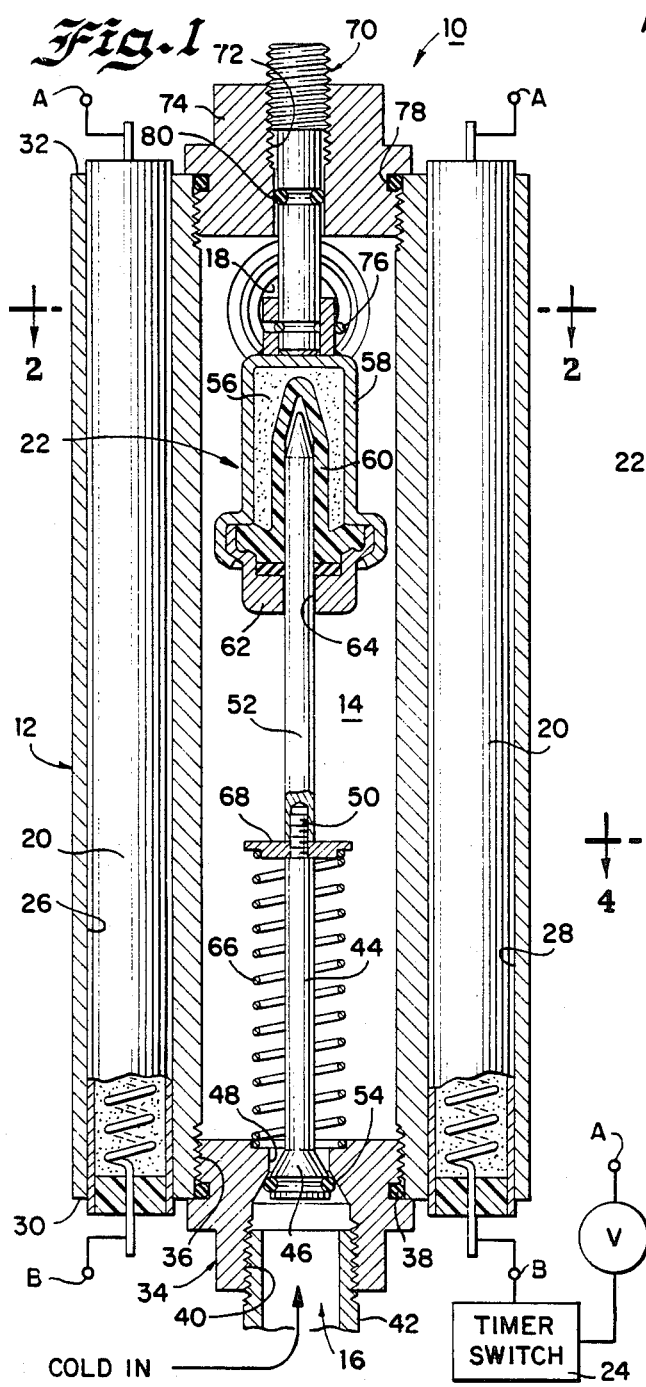
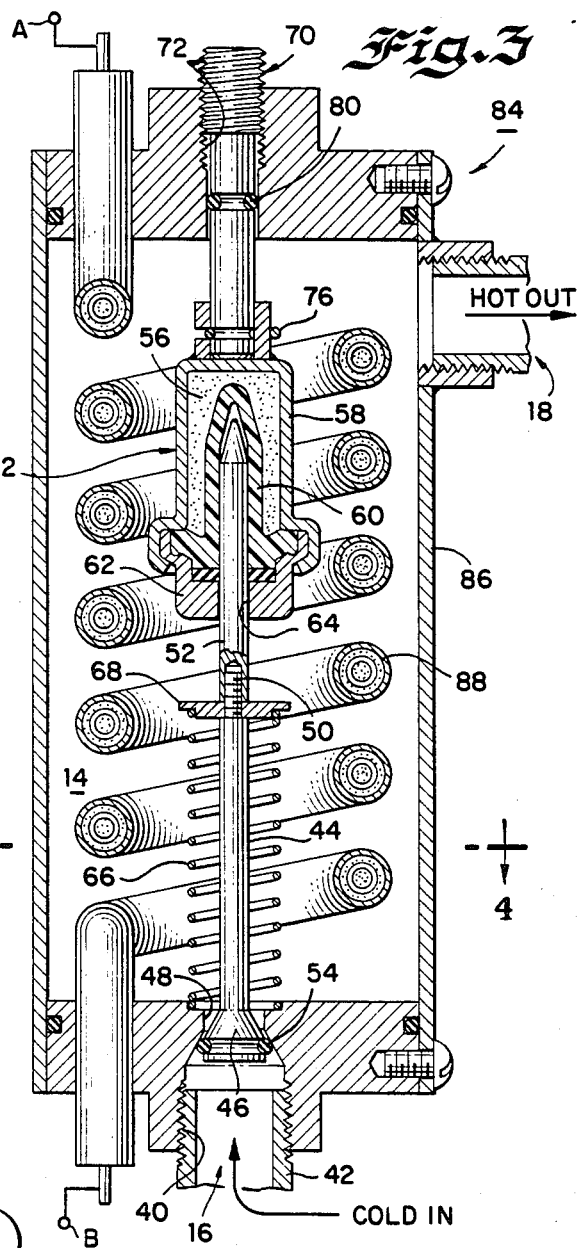
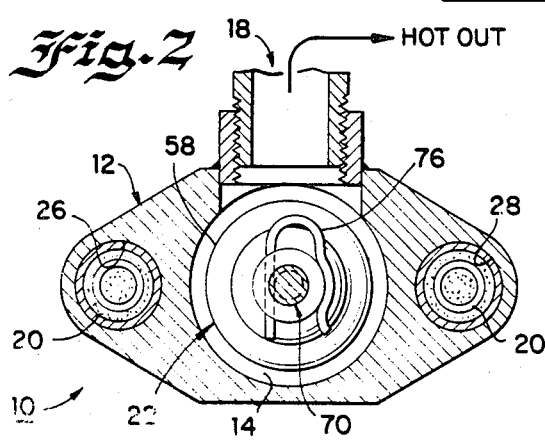
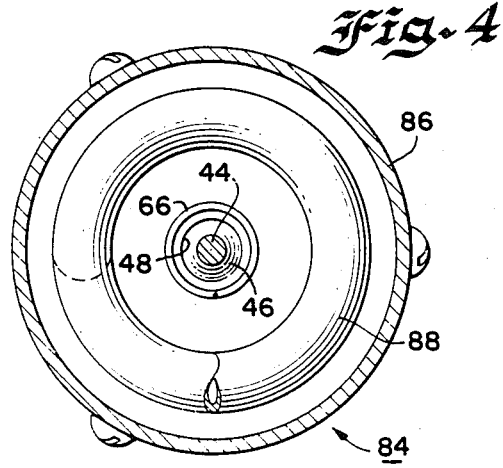

HOT WATER DISPENSER

This is a continuation-in-part of application Ser. No. 912,251, filed Sept. 29, 1986, now abandoned.

BACKGROUND OF THE INVENTION

The present invention generally relates to a hot water dispenser, and more particularly to a hot water dispenser for dispensing a selected volume of water having a preselected temperature.

Various types of hot water dispensers are known in the prior art. Many of the known dispensers are complex and expensive in construction. For example, U.S. Pat. No. 3,326,417 issued June 20, 1967 discloses an automatic liquid dispensing machine including a cup movable in a vertical path from a lower discharge position to a filling and heating position thereabove. The cup has a discharge opening in its bottom through which liquid may be discharged, with a liquid reservoir having a discharge passageway for introducing liquid into the cup. A heating element associated with said cup for heating liquid within said cup, a detent for latching the cup in the heating or filling position, a thermostat actuated by the temperature of liquid within said cup for actuating the detent to release the cup when the liquid has reached a prescribed temperature. A valve is actuated by movement of the cup for closing the discharge opening upon upward movement of said cup and for opening the discharge opening upon downward movement of said cup. The valve is also operative for opening the discharge passageway from the reservoir for supplying a measured amount of liquid from the reservoir to the cup when said cup is moved upwardly.

U.S. Pat. No. 4,459,465 discloses an instantaneous water-heater which has a plurality of thermostat-controlled heating elements, with an electrical contactor wired in series between each respective heating element and thermostat, which contactor acts both as a temperature control and, with the contactors acting in series with each other, as a safety shut-off control.

Generally, prior coffee brewing and hot water dispensing systems have used reservoirs to pre-measure the quantity of water desired. This is the case with the U.S. Pat. No. 3,333,527 issued to Bender and the U.S. Pat. No. 4,000,396 issued to Abel, Jr. These systems isolate the quantity desired from any fluctuation in inlet pressure or temperature. Of course, this reservoir system prohibits a compact design and makes it impractical without accurate flow control and measuring devices to directly connect the system to a water line.

In the U.S. Pat. No. 3,948,156 issued to Smith, there is described an apparatus for direct connection to a water line. This system provides a pressure regulator and flow control to deliver a precise quantity of water to the heater during a timed interval. Additionally, the power to the heater is controlled in response to the inlet temperature of the water to regulate the outlet temperature to eliminate steam. No prior art device has been suggested which is operable without all these controls, allows direct connection to a water supply line, and will deliver reliable quantities of hot water.

Accordingly, a need exists to provide a hot water dispenser that is relatively simple in construction, economical to manufacture and both effective and efficient in operation.

Moreover, a long felt need has been demonstrated for a coffee brewing apparatus which is directly connectable to a water line, and which delivers reliable quantities of water, independent of inlet temperature and pressure and independent of line voltage.

SUMMARY OF THE INVENTION

An object of the invention is to provide a new and improved hot water dispenser.

Another object of the invention is to provide a new and improved hot water dispenser that is dimensionally small and compact in size.

Another object of the invention is to provide a new and improved hot water dispenser for dispensing a selected volume of water having a predetermined temperature.

Another object of the invention is to provide a new and improved hot water dispenser for dispensing a selected volume of heated water for brewing coffee.

A further object of the invention is to provide a new and improved hot water dispenser that is compact and simple in construction, economical in manufacture and both efficient and reliable in operation.

It is yet a further object to provide a hot water dispenser for coffee brewing which delivers an accurate quantity of water at an accurate temperature over a timed interval, while limiting the tendency to cause fouling of the heat exchanger by minimizing boiling.

Briefly, in accordance with these and other objects and advantages of the present invention, there is provided a hot water dispenser for dispensing a selected volume of water at a predetermined water temperature. The dispenser has a body defining a predetermined sized cavity having an inlet for receiving cold water and an outlet for dispensing hot water. A heating mechanism is disposed within the body for heating the water contained within the cavity. A manually operable timer switch is operated to energize the heating mechanism and to select a time period for maintaining the heating mechanism energized. This selected time period determines the selected volume of heated water dispensed. A thermally responsive mechanism enables dispensing water from the outlet responsive to the predetermined water temperature of the heated water.

BRIEF DESCRIPTION OF THE DRAWING

The above and other objects and advantages of the present invention may be best understood from the following detailed description of the preferred embodiments illustrated in the accompanying drawing, wherein:

FIG. 1 is a partly schematic and sectional view of a hot water dispenser constructed in accordance with the principles of the present invention;

FIG. 2 is a cross-sectional view taken along the line 2—2 of FIG. 1;

FIG. 3 is an alternative embodiment of a hot water dispenser constructed in accordance with the principles of the present invention; and FIG. 4 is a cross-sectional view taken along the line 4—4 of FIG. 3.

DETAILED DESCRIPTION OF THE PREFERRED EMBODIMENT

Figure 5:
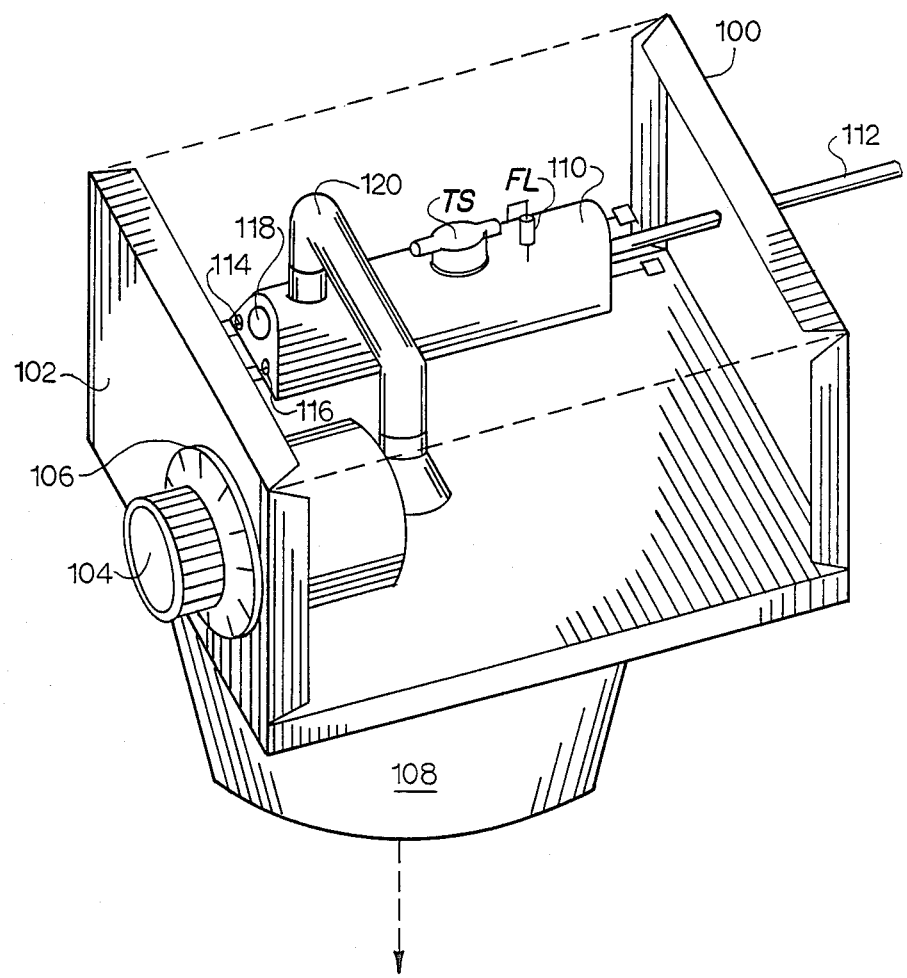
FIG. 5 is a pictorial view of portions of the hot water dispensing apparatus having a coffee brewing receptacle arranged to be mounted to dispense coffee into selected containers.

Referring now to FIG. 1, there is illustrated a hot water dispenser generally designated by the reference numeral 10. As to its major components, dispenser 10 includes a housing or body 12 for defining a predetermined size cavity 14 having an inlet 16 for receiving cold water and an outlet 18 for dispensing heated water; a heating device 20 for heating the water within the cavity 14; a thermally responsive actuator mechanism 22 for dispensing water at a predetermined temperature; and a manually operable timer switch 24 for energizing and for selecting a time period for maintaining the heating device 20 energized.

Dispenser body 12 is formed of a heat conductive, easily machineable and durable material, such as aluminum. In accordance with a feature of the invention, body 12 may be compact and dimensionally small, for example, such as having nominal dimensions of 2"×1" by 6". A pair of bores or cavities 26 and 28 are drilled in the housing body 12 adjacent the centrally disposed water containing cavity 14 for receiving the heating device 20, such as a pair of electrical resistance heating rod elements 20. The heating elements 20 include a pair of terminals A and B that are connected in a conventional fashion to an external power source V via the timer switch 24. The power source V can be either an alternating current AC or direct current DC power supply. The flow rate or hot water dispensing rate of the dispenser 10 is proportional to the power rating of the heating elements 20 that may each have a power rating, for example, of 500 watts. Accordingly, a voltage regulated power supply V can be utilized for more precisely controlling the flow rate of the dispenser 10.

As shown in FIGS. 1 and 2, the water inlet 16 is provided at one end wall 30 of body 12 with the water outlet 18 disposed near a second opposite end 32 of the body 12. Water inlet 16 includes a valve 34 that is rotatably received within a threaded interior cavity wall portion 36 of the cavity 14. Valve 34 may include an O-ring 38 for proper sealing between the valve 34 and the interior cavity wall portion 36. Valve 34 has a threaded interior cavity wall 40 for conventional connection to a fresh water supply conduit 42, as shown. A valve operating stem 44 has an enlarged end 46 slidably received within a valve cavity 48 and an opposite threaded end 50 mounted within a piston 52 of the thermally responsive actuator assembly 22. An O-ring 54 is carried by the enlarged end 46 for sealing the water inlet 16 when the valve 34 is closed.

The thermally responsive actuator assembly 22 includes a mass 56 of solidified, thermally expansive material, such as wax confined within a housing 58 by an elastomeric sleeve 60 fixedly secured within the housing 58 by a housing cover 62, as shown. The piston 52 axially extends through an opening 64 within the cover 62 and is positioned to abut the elastomeric sleeve 60 by compression spring 66 that extends between a flange 68 captured between the piston 52 and the valve stem 44 and the valve cavity 48. The thermally responsive actuator assembly 22 is positioned within the cavity 16 by a screw or support stem 70 that is received within a threaded opening 72 of a threaded collar 74 that seals the cavity 16 at the housing wall 32. The support stem 70 is mounted to the housing 58 with a clip 76, as shown. O-rings 78 and 80 are employed with collar 72 and support stem 70, respectively, for conventional sealing purposes. External adjustment of the support stem 70 adjusts the position of the assembly 22 to provide a fine adjustment or trim for the predetermined water dispensing temperature.

In operation, the hot water dispenser 10 is enabled by the manual operation of the timer switch 24 to select an operating time that is proportional to and determines the volume of hot water to by dispensed. The heating elements 20 are energized to rapidly heat the water contained within cavity 14. As the water temperature rises, the thermally expansive mass 56 expands against the elastomeric sleeve 60, causing the piston 52 and the valve stem 44 to advance to open the valve 34 when the heated water temperature reaches the predetermined water dispensing temperature. With valve 34 in the open position, fresh cold water is received through the inlet 16 into the cavity 14 and the heated water is dispensed via outlet 18. As the water temperature drops, the thermally expansive material 56 contracts and the piston 52 is returned to its original position by pressure from the spring 66, thereby closing the valve 34. This cycle of opening and closing the valve 34 for dispensing heated water at the predetermined temperature continues until the timer switch 24 opens at the end of the selected time interval to then deenergize the heating elements 20.

The operation of this hot water dispenser is represented by the following mathematical model:

$$VW = \text{Watts} \times 3.414 \times (1/0.065) \times (1/\text{To-Ti}) \times ((T_{set}-T_{start})/60) \times 0.97$$

Where:
  VW = volume of 200 Deg F. Water Dispensed in ounces.
  Watts = heater Watts supplied to the heating System.
  3.41443 = BTU's/Watt(Constant for Resistance heater).
  1/.065 = Conversion Factor, 1 ounce = 0.065 Pounds of Water
  To = Temperature of the water eluted from heating system.
  Ti = Temperature of the water supplied to the Unit.
  Tset = Time set on dial in minutes.
  Tstart = Time to heat the heater body to greater than 200 Deg F. at which time water flow begins. This is a function of the mass of the heater assembly and wattage.
  0.97 = Correction factor to account for heat loss to the enclosure.

Testing of the system over a variety of line voltages and inlet temperatures yielded the following dispensed ounces and proved the accuracy of the system:

| Supply Voltage and resulting (Watts) | Delta T. (Inlet Temp) | Os's Disp. in 10 Min. Cycle Tstart = .4 |
| --- | --- | --- |
| 120 (1000) | 140 (60) | 58 |
| 115 (944) | 140 (60) | 55 |
| 110 (864) | 140 (60) | 51 |
| 115 (944) | 130 (70) | 59 |

-continued

| Supply Voltage and resulting (Watts) | Delta T. (Inlet Temp) | Os's Disp. in 10 Min. Cycle Tstart = .4 |
| --- | --- | --- |
| 115 (944) | 140 (60) | 55 |
| 115 (944) | 150 (50) | 51 |

Referring now to FIGS. 3 and 4, there is shown an alternative embodiment of a hot water dispenser designated by the reference character 84 and constructed in accordance with the principles of the present invention. Identical reference numbers are used to identify similar components of the dispenser 84 as before described with respect to the hot water dispenser 10. In the alternative hot water dispenser 84, a hollow metal tube 86 defines the predetermined size cavity 14 with an immersion heater 88 disposed within the cavity 14. The tube 86 can be sealed as shown and have nominal dimensions; for example, of 1"×6".

Figure 7:
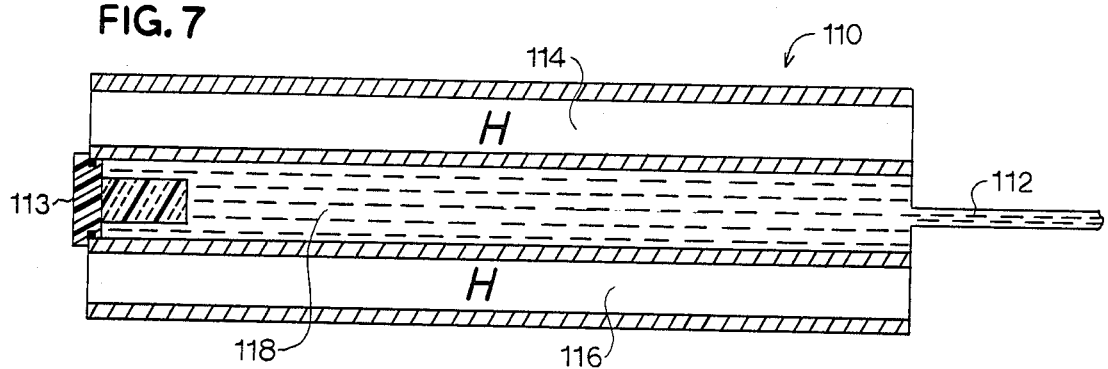
FIG. 7 is a cut away illustration of the heater system used in the hot water dispensing apparatus of the present invention.

When used as a coffee brewing system the hot water dispenser of the present invention is incorporated into a housing 100 (FIG. 5) presenting on its forward face 102 a timer dial 104 having calibrations 106 corresponding to cups of coffee to be dispensed. Below the housing there is provided a selectively removeable receptacle 108 for holding coffee grounds and filters. The water heating block 110 is arranged to receive cold water through a direct line connection 112, and is shown with the end cap 113 (FIG. 7) removed exposing the heater elements 114 and 116 and showing the internal water cavity 118. The water cavity 118 and heater element 114 and 116 relationship is more clearly shown in FIG. 7.

Figure 6:
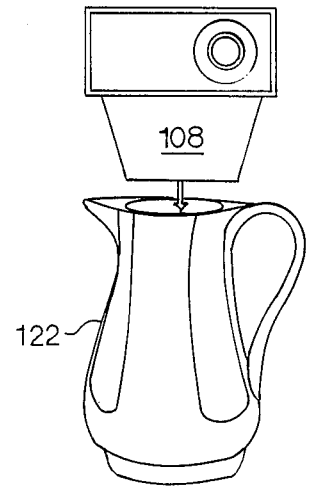
FIG. 6 depicts a front elevational view of a coffee dispensing system using the hot water dispensing system in accordance with the present invention.

Cold water inlet through the connection 112 is brought into the water cavity and heated as above described. Hot water is directed out the top connection 120, by displacement, to the coffee grounds in the receptacle 108. When this apparatus is mounted to a wall or under a cabinet, it is positioned as shown in FIG. 6 to direct brewed coffee out of the receptacle 108 to a thermally insulated container 122.

To minimize the tendency of this hot water dispenser to generate steam, the heater units, as shown in FIG. 5, are preferably positioned in the lower half of the block 110. Additionally, during operation the block is mounted on an angle relative to the horizontal. The hot water discharge end is raised and positioned approximately ½" higher than the inlet.

Figure 8:
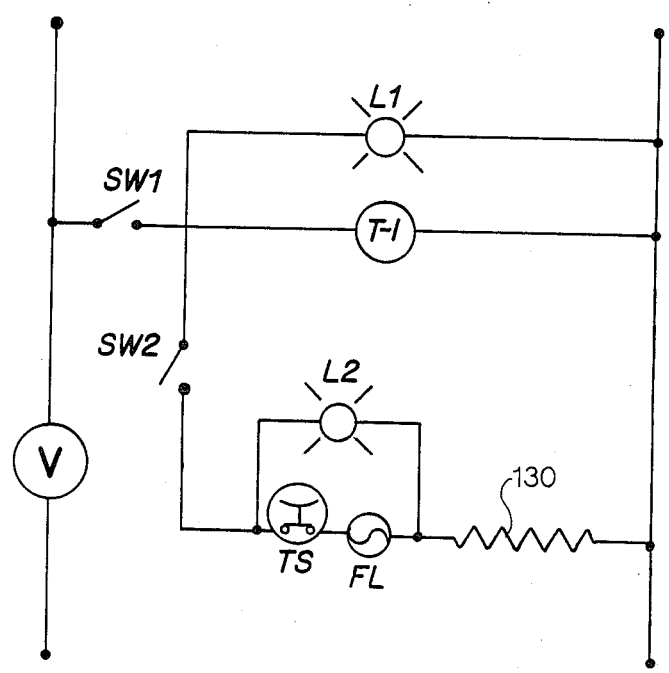
FIG. 8 is a schematic of the electrical circuitry of the hot water dispensing apparatus of the present invention.
Figure 9:
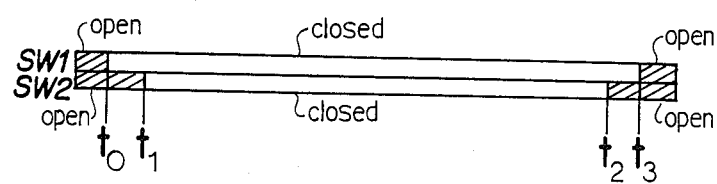
FIG. 9 illustrates a timing chart of the operation of the circuitry of FIG. 8.

Turning now to the schematic shown in FIG. 8, a power supply V is arranged to power the timer motor T1 through the on/off switch SW1, and "power on" is indicated generally by illumination of the light L1. Power to the heater elements 130 is provided through the switch SW2, a temperature limit switch TS and a fusible link FS. Accordingly, the service lamp L2 will light if the fusible link or limit switch opens the circuit. During operation, the switches are controlled by the timer to open in accordance with the timing chart of FIG. 9. At time "t₀" switch SW1 is closed to provide power to the system and, after a predefined delay, switch SW2 is closed to provide power to the coils. Near the end of the timed cycle, first SW2 is opened at T₂ and then after a delay, about 15 to 20 seconds later, SW1 is opened at t₃. This sequencing of the switches allows the flow of water to stop before the power to the lamp is shut off.

Although the present invention has been described in connection with details of the preferred embodiments, many alterations and modifications may be made without departing from the invention. Accordingly, it is intended that all such alterations and modifications be considered within the spirit and scope of the invention as defined in the appended claims.

What is claimed and desired to be secured by Letters Patent of the United States is:

1. A hot water dispenser for dispensing a selected volume of heated water comprising:
    means for defining a predetermined sized cavity for maintaining a predetermined volume of water therein, having an inlet means for receiving cold water and an outlet means for dispensing hot water, said inlet means being directly connected to a water supply line for providing an unmeasured quantity of water;
    valve means disposed within said inlet means for opening and closing said inlet means;
    heating means for heating water contained within said cavity;
    manually operable means for selecting a dispensed volume by energizing said heating means and for selecting a time period for maintaining said heating means energized, said selected time period being proportional to said selected volume; and
    thermally responsive means for dispensing water from said outlet responsive to a preselected water temperature of said heated water, said thermally responsive means including a thermal actuator extending within said cavity and connected to said valve means for opening said valve means responsive to said preselected water temperature.

2. A hot water dispenser as recited in claim 1 wherein said cavity defining means comprises a generally tubular body.

3. A hot water dispenser as recited in claim 2 wherein said tubular body has said inlet means including said valve means positioned at one end and said outlet means positioned near its other end.

4. A hot water dispenser as recited in claim 3 wherein said thermal actuator includes a spring biased piston rod operatively coupled to a mass of solidified thermally expansive material.

5. A hot water dispenser as recited in claim 1 wherein said heating means are positioned within said cavity defining means.

6. A hot water dispenser as recited in claim 1 wherein said heating means has a predetermined power rating proportional to a desired flow rate of the hot water dispenser.

7. A hot water dispenser as recited in claim 1 wherein said manually operable time period selecting means comprises a timer controlled switch.

8. A hot water dispenser as recited in claim 1 wherein said cavity defining means comprises an elongated body of heat conductive material having at least one separate cavity formed adjacent said water containing cavity for receiving said heating means.

9. The hot water dispenser for dispensing a selected volume of heated water of claim 1 wherein said valve means comprises:
    a valve stem member connected to said thermal actuator at one extremity and arranged to protrude through the inlet opening in said cavity;
    sealing means on said protruding extremity of said valve stem for sealing against the outer surface of said cavity; and wherein said thermally responsive means comprises means to shift said valve stem outwardly to open said inlet valve.

10. The hot water dispenser for dispensing a selected volume of heated water of claim 9 wherein said means to shift said valve stem comprises a capsule of expandable wax-like material arranged to envelop the extremity of the valve stem and to shift said valve stem outwardly when said wax-like material changes to a liquid state and expands, and further comprising means to urge said valve stem inwardly when said wax-like material contacts.

11. The hot water dispenser of claim 1 wherein said heating means and said means for defining a predetermined sized cavity are housed within an elongated block member.

12. The hot water dispenser of claim 11 wherein said heating means is positioned below said means for defining a predetermined sized cavity.

13. The hot water dispenser of claim 12 wherein said block member is mounted for operation such that the end having outlet means is raised relative to the end having inlet means.

* * * * *